United States Patent
Heaysman

(10) Patent No.: US 6,907,262 B1
(45) Date of Patent: Jun. 14, 2005

(54) RADIOTELEPHONE HANDSET

(76) Inventor: Renford Heaysman, 407 Sunrise Kitakoshigaya, Osawa 3-22-18, Koshigaya-shi, Saitama-ken (JP)

( * ) Notice: Subject to any disclaimer, the term of this patent is extended or adjusted under 35 U.S.C. 154(b) by 450 days.

(21) Appl. No.: 09/718,498

(22) Filed: Nov. 24, 2000

(Under 37 CFR 1.47)

(30) Foreign Application Priority Data

Nov. 23, 1999 (GB) .............................................. 9927667

(51) Int. Cl.$^7$ .............................................. H04M 1/02
(52) U.S. Cl. .................................. 455/550.1; 455/575.4
(58) Field of Search .......................... 455/550.1, 575.1, 455/575.3, 575.4, 90.3, 575.8, 574, 550, 566, 575, 90, 556; 379/433.01, 433.11, 433.12

(56) References Cited

U.S. PATENT DOCUMENTS

| | | | | |
|---|---|---|---|---|
| 5,175,759 A | * | 12/1992 | Metroka et al. | 455/569.1 |
| 5,657,370 A | * | 8/1997 | Tsugane et al. | 455/566 |
| 5,710,576 A | * | 1/1998 | Nishiyama et al. | 345/169 |
| 5,881,377 A | * | 3/1999 | Giel et al. | 455/343.1 |
| 5,894,298 A | * | 4/1999 | Hoeksma | 345/102 |
| 6,073,027 A | * | 6/2000 | Norman et al. | 455/575.4 |
| 6,215,993 B1 | * | 4/2001 | Ulveland | 455/415 |
| 6,243,595 B1 | * | 6/2001 | Lee et al. | 455/566 |
| 6,282,436 B1 | * | 8/2001 | Crisp | 455/575.4 |
| 6,311,076 B1 | * | 10/2001 | Peuhu et al. | 455/566 |

FOREIGN PATENT DOCUMENTS

| | | | | |
|---|---|---|---|---|
| EP | 647037 | | 4/1995 | |
| EP | 0 647 037 A1 | * | 5/1995 | H04B/1/38 |
| EP | 0 647 037 | * | 5/1995 | H04B/1/38 |
| EP | 939532 | | 9/1999 | |
| GB | 2266429 A | | 10/1993 | |
| GB | 2308939 A | | 7/1997 | |
| GB | 2308939 | | 7/1997 | |
| GB | 2 308 939 | * | 9/1997 | H04M/1/22 |
| GB | 2 308 939 A | * | 9/1997 | H04M/1/22 |
| GB | 2 316 837 | * | 4/1998 | H04Q/7/38 |
| GB | 2326051 A | | 12/1998 | |
| GB | 2327315 A | | 1/1999 | |
| GB | 2327315 A | * | 1/1999 | H04M/1/22 |
| GB | 2328348 | | 2/1999 | |
| GB | 2347300 | | 8/2000 | |
| JP | 7074691 | | 3/1995 | |
| JP | 9062198 | | 3/1997 | |
| WO | 9107835 | | 5/1991 | |
| WO | WO 9209163 | | 5/1992 | |

* cited by examiner

*Primary Examiner*—William Trost
*Assistant Examiner*—Brandon J. Miller
(74) *Attorney, Agent, or Firm*—Antonelli, Terry, Stout & Kraus, LLP

(57) ABSTRACT

A radiotelephone handset, including a display; a keypad; a cover moveable between a closed position and an open position in which the keypad is accessible to the user; and means for lighting the display and keypad to an extent limited by the position of the cover. When the cover is in a closed position, some, but not all of the keys and not the display, are obscured by the cover, when the cover is in the closed position, the lighting means may light only the display and those keys of the keypad not hidden by the cover. These keys may be used, for quite long periods, to, for example, operate a web browser, other over the air services where limited key access is sufficient, or simply to retrieve some information from the memory of the radiotelephone. During this period, while the cover remains in the closed position, the keys hidden by the cover remain deactivated. The cover can be a slide or a flip.

12 Claims, 5 Drawing Sheets

RADIOTELEPHONE HANDSET

BACKGROUND OF THE INVENTION

The present invention relates generally to a radiotelephone handset.

It is well known to provide a radiotelephone with a user-moveable cover which in its closed position covers all or most of the keys of the keypad.

Conventionally, the radiotelephone is carried around by the user in this position. When the radiotelephone is actively used by the user, for example, when placing or receiving a call, the cover can be moved by the user to its open position for the duration of the call. It is also well known to provide a radiotelephone with user-interface lighting for illuminating the display and keypad when the radiotelephone is actively used by the user.

The present invention is concerned with power conservation in a radiotelephone handset equipped with both a user-moveable cover and user-interface lighting.

SUMMARY OF THE INVENTION

With this in mind, according to one aspect of the present invention, there may be provided a radiotelephone handset, including
a display;
a keypad;
a cover moveable between a closed position and an open position in which the keypad is accessible to the user; and
means for lighting the display and keypad to an extent limited by the position of the cover.

By virtue of the functionality provided by these features, the present invention is able to match the lighting provided by the handset to those parts of the handset which can be seen by the user, and so does not waste power lighting parts of the handset which are obscured from the user by the cover.

For example, in a handset in which when the cover is in a closed position, the display and all the keys are obscured by the cover, when the cover is the closed position, the lighting means is not operable to provide any lighting. In a handset in which when the cover is in a closed position, all the keys, but not the display, are obscured by the cover, when the cover is in the closed position, the lighting means may provide lighting to only the display. In a handset in which when the cover is in a closed position, some, but not all of the keys and not the display, are obscured by the cover, when the cover is in the closed position, the lighting means may light only the display and those keys of the keypad not hidden by the cover.

The present invention is particularly advantageous in relation to this last type of handset, where the keys not hidden by the cover might be used, for quite long periods, to, for example, operate a web browser, other over the air services where limited key access is sufficient, or simply to retrieve some information from the memory of the radiotelephone. During this period, while the cover remains in the closed position, the lighting for the keys hidden by the cover remains deactivated.

In one embodiment, the cover position detection means comprises a single switch which attains a predetermined state when the cover reaches a predetermined position. The predetermined position may be when the cover is fully open, or alternatively fully closed.

In a further embodiment, the cover position detection means comprises a plurality of switches which each attains a state when the cover reaches a predetermined position. In this way, the lighting provided by the handset can be more finely matched to the position of the cover. Alternatively, finer matching can be achieved, in another embodiment, by implementing the cover position detection means as analogue transducer means operable to produce an analogue signal indicative of the position of the cover.

Preferably, the cover can take the form of a slide or a flip.

According to a further aspect of the invention, there may be provided a method of controlling a radiotelephone handset including a user-moveable cover and user-interface lighting, wherein the user-interface lighting is activated only for those portions of the user-interface which are not hidden by the cover.

BRIEF DESCRIPTION OF THE DRAWINGS

Exemplary embodiments of the invention are hereinafter described with reference to the accompanying drawings, in which.

DETAILED DESCRIPTION OF THE DRAWINGS

Figure 1:
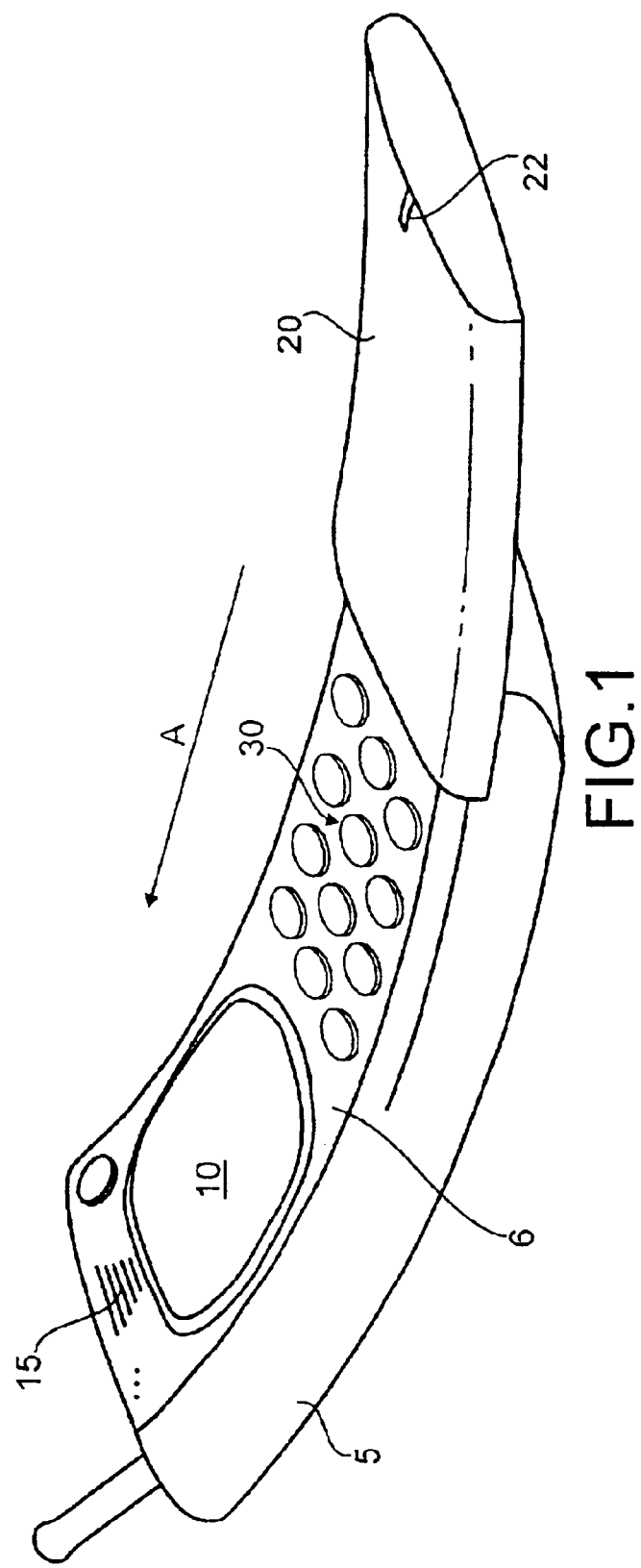
FIG. 1 shows a radiotelephone equipped with a cover in the form of a slide.

FIG. 1 shows a radiotelephone handset comprising a main body 5 having a front face 6 which is provided with a liquid crystal display 10, a loudspeaker 15, and a keypad 30. Each key on the keypad is made from a translucent material which is coated all over except for the area necessary define the indicia/indices for that key. A cover in the form of a slide 20 is slidingly mounted to the main body 5 such that it can be moved from its fully-extended, open position as shown in FIG. 1 to its closed position as illustrated by the arrow A. In the closed position, the slide 20 covers all the keys of the keypad 30, but not the display 10. The slide 20 has mounted therein a microphone 22.

Figure 2:
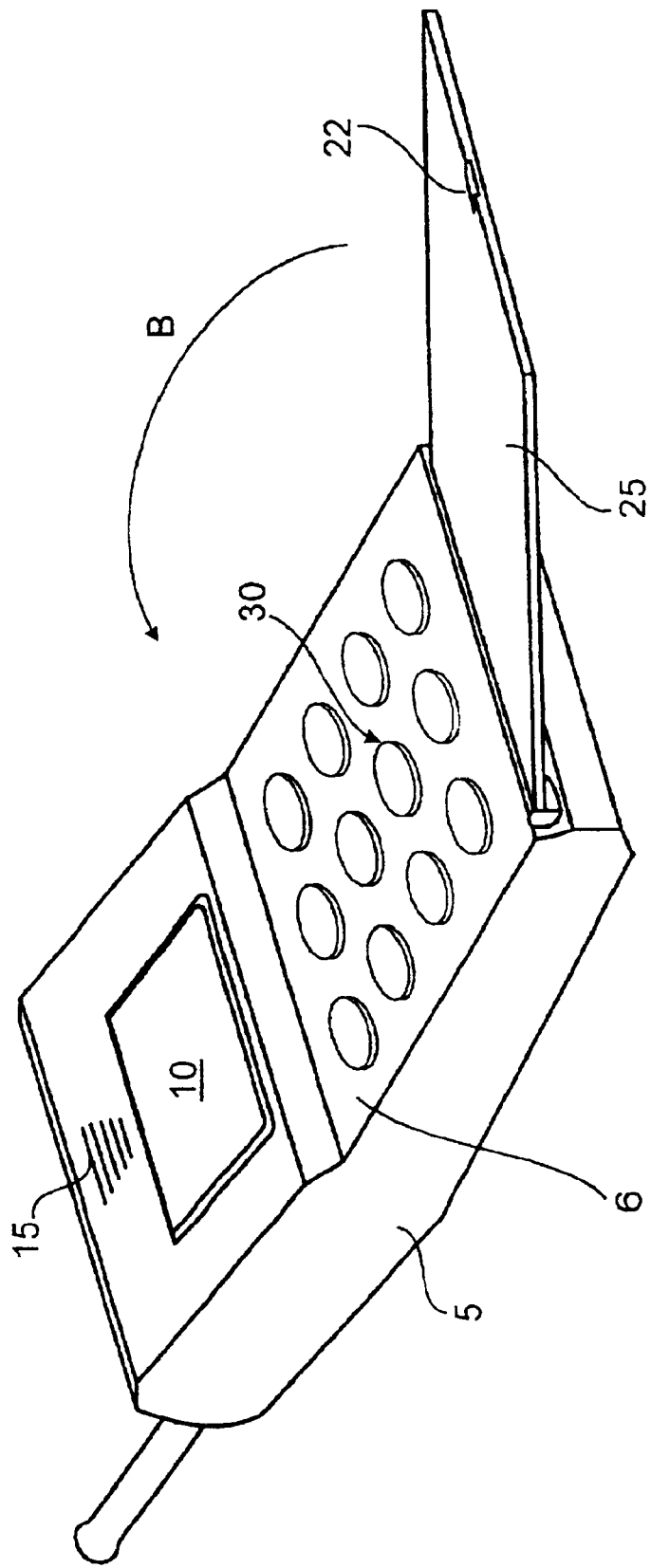
FIG. 2 shows a radiotelephone equipped with a cover in the form of a flip.

FIG. 2 shows a similar radiotelephone handset to the one in FIG. 1 except that instead of the slide 20, a cover in the form of a flip 25 is mounted for rotation to the main body 5 such that it can be moved from its fully open position as shown in FIG. 2 to its closed position as illustrated by the arrow B. In the closed position the flip covers all the keys of the keypad 30, but not the display 10.

Figure 3:
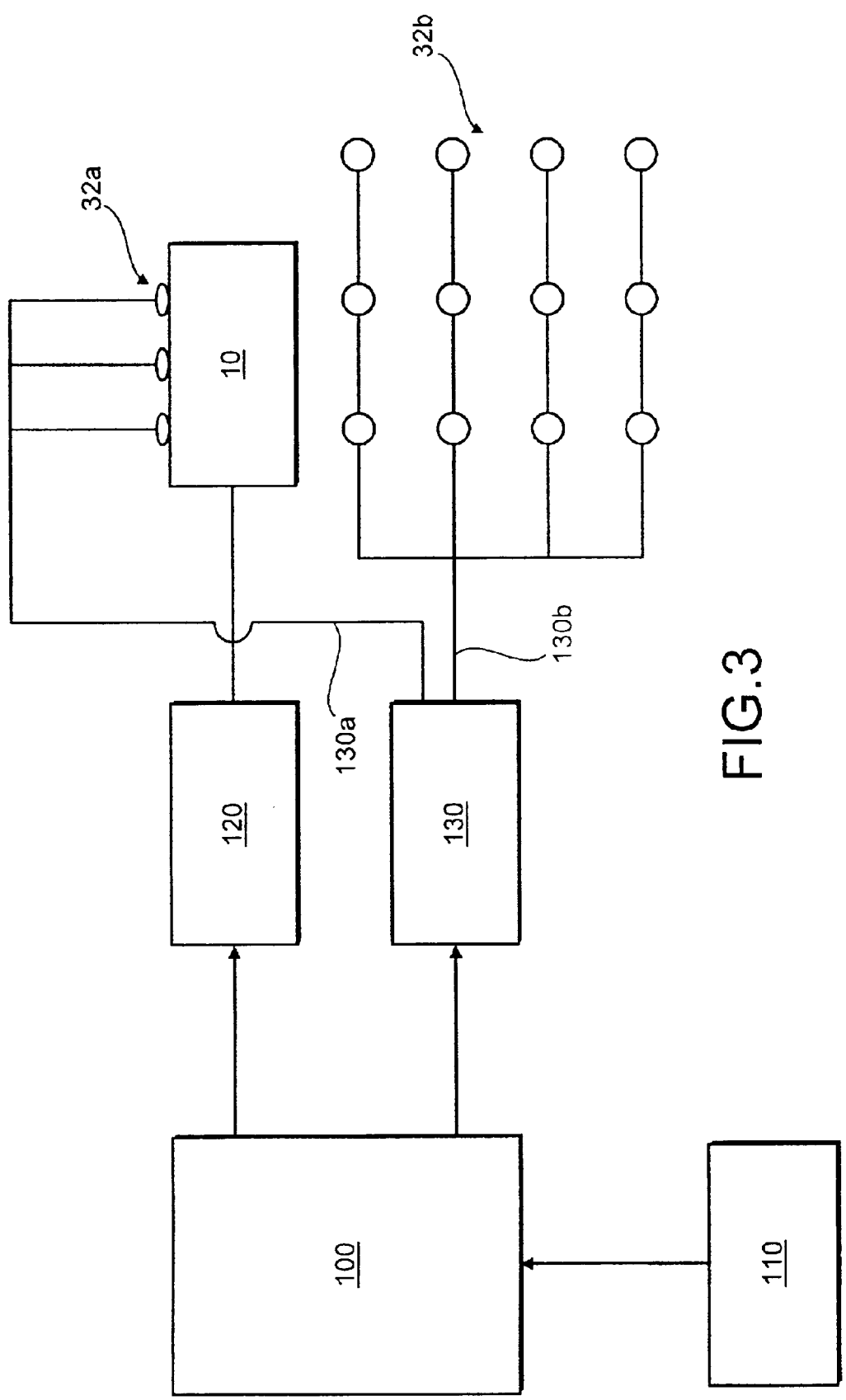
FIG. 3 shows a block diagram illustrating the hardware layout of the radiotelephone of FIGS. 1 and 2.

The hardware layout of the FIG. 1 and FIG. 2 embodiments will now be described with reference to FIG. 3. For the sake of convenience, the description will focus on a description of the slide 20, but unless otherwise stated, what is said in relation to the slide 20 also applies mutatis mutandis to the flip 25.

The radiotelephone includes a control processing unit 100 for controlling and coordinating the general operation of the radiotelephone. The processing unit is coupled to a slide switch 110 which is provides an indication of whether the slide 20 is in its open position or not. The processing unit is also operable to control a display driver 120 for driving the display 10, and a backlighting driver 130 for controlling the backlighting. The backlighting comprises an array of light emitting diodes (LED) which are mounted at various locations on the printed circuit board of the radiotelephone. Individual LEDs 32b are mounted behind each key on the keypad 30 and addressable as a group by a control line 130a of the backlighting driver 130. LEDs 32a are mounted at the periphery of the LCD 10 and addressable as a group by a control line 130b of the backlighting driver 130.

FIGS. 4(a–c) illustrate the operation of various embodiments of the invention.

Figure 4C:
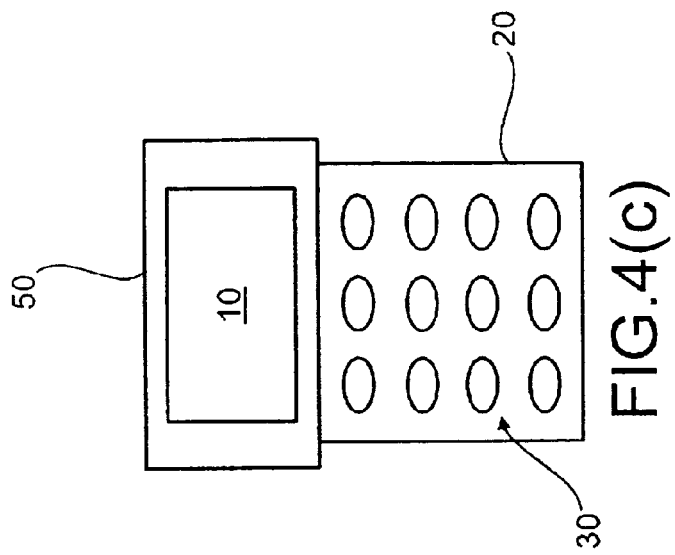
FIGS. 4(a–c) show the relationship between the position of a slide and the backlighting for various embodiments of the invention.
Figure 4B:
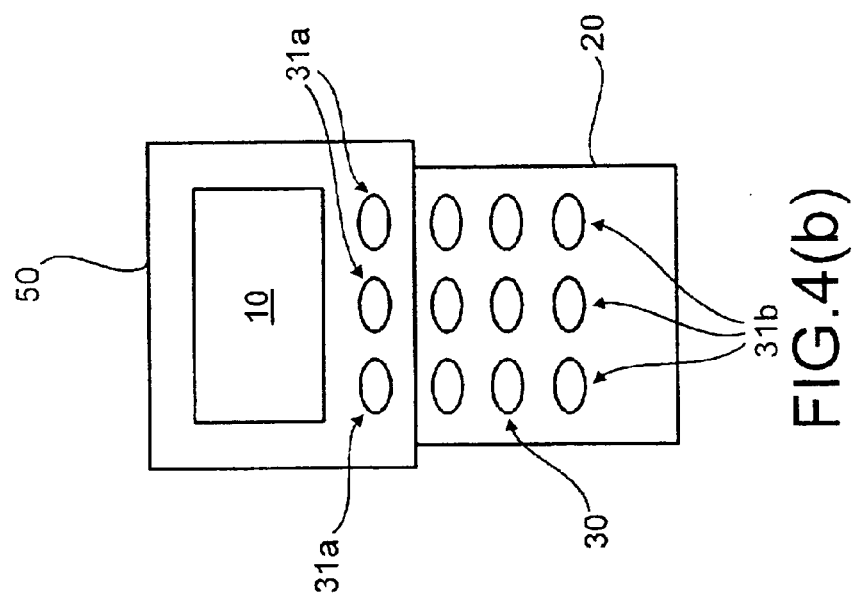
Figure 4A:
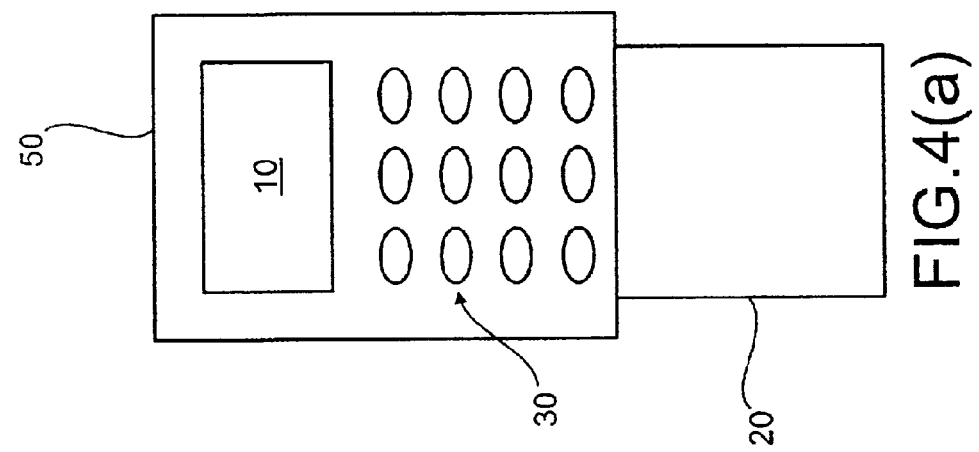

In a first embodiment of the invention, FIG. 4(c) represents the radiotelephone with the slide 20 in its closed position and FIG. 4(a) represents the radiotelephone with the slide 20 in its open position, whereby it will be appreciated that when slide 20 is in its closed position, all the keys of the keypad are obscured by the slide 20.

In this embodiment, activation of the backlighting from the FIG. 4(c) slide position can be caused in two ways:—
Receipt of an Incoming Call.

Because the slide switch 110 is providing an indication that the cover is not in its open position, the control processing unit 100 instructs the backlighting driver 130 to activate only the LEDS 32a associated with the LCD 10. This is the situation in FIG. 4(c) in which the box 50 represents the area of the radiotelephone where the backlighting is operable. If the call proceeds without movement of the slide 20, then the LEDs 32b are not activated. On the other hand, if the slide 20 is moved to its open position, this is sensed by the slide switch 110, whereby the control processing unit 100 also instructs the backlighting driver 130 to not only activate the LEDs 32a associated with the LCD 10 but also the LEDs 32b associated with the keypad 30. This is the situation in FIG. 4(a) in which the box 50 represents the area of the radiotelephone where the backlighting is operable. Once the slide switch 110 detects that the slide 20 has left its open position, LEDs 32b are again deactivated.

The LEDs 32a are deactivated after a set period during which the radiotelephone has not been actively used.

(ii) Keyboard Access Required.

The user may wish to do this, for example, to gain access to the keyboard in order to retrieve information from the memory of the radiotelephone.

Moving the slide 20 to its open position will cause the control processing unit 100 to activate the backlighting to the extent permitted by the position of the slide 20, that is, activate the LEDs 32b and 32a. This is the situation in FIG. 4(c) in which the box 50 represents the area of the radiotelephone where the backlighting is operable. In this case, when the slide 20 is returned to its closed position, the control processing unit 100 instructs the backlighting driver 130 to deactivate both sets of LEDs 32b and 32a.

Thus, it will be appreciated that when the slide 20 is in its closed position, the LEDs 32a associated with the display 10 can be activated or deactivated according to the specific user-interface functionality programmed into the control processing unit 100.

Figure 5:
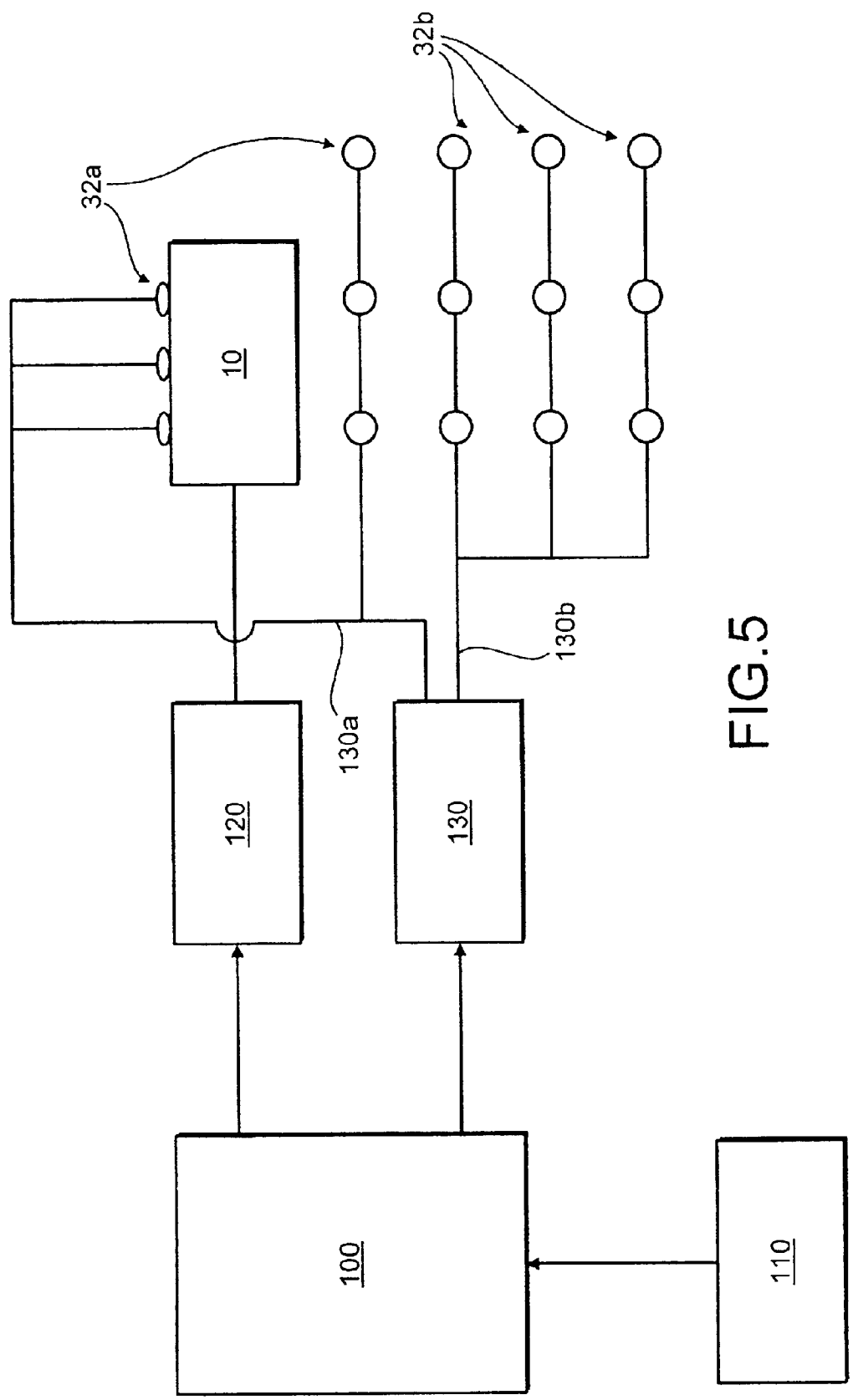
FIG. 5 shows the block diagram of FIG. 3 with modified backlighting circuitry.

In a second embodiment of the invention, FIG. 4(b) represents the radiotelephone with the slide 20 in its closed position and FIG. 4(a) represents the radiotelephone with the slide 20 in its open position, whereby it will be appreciated that when slide 20 is in its closed position, most of the keys 31b of the keypad are obscured by the slide 20, but the keys 31a closest to the display 10 remain accessible. In this embodiment, the addressing of the backlighting LEDs is modified as illustrated in FIG. 5. The address line 130a addresses, as a group, the LEDs associated with the display 10 and the keys 31a. In consequence, this group of LEDs is in the context of this embodiment referred to as 32a. The address line 130b addresses as a group the LEDs associated with the keys 31b.

In this embodiment, activation of the backlighting from the FIG. 4(b) slide position can be caused in three ways:—
Receipt of an Incoming Call.

Because the slide switch 110 is providing an indication that the cover is not in its open position, the control processing unit 100 instructs the backlighting driver 130 to activate only the LEDS 32a associated with the LCD 10 and the visible keys 31a. This is the situation in FIG. 4(b) in which the box 50 represents the area of the radiotelephone where the backlighting is operable. If the call proceeds without movement of the slide 20, then the LEDs 32b are not activated. On the other hand, if the slide 20 is moved to its open position, this is sensed by the slide switch 110, whereby the control processing unit 100 also instructs the backlighting driver 130 to not only activate the LEDs 32a associated with the LCD 10 and the visible keys 31a but also the LEDs 32b associated with the previously hidden keys 32b. This is the situation in FIG. 4(a) in which the box 50 represents the area of the radiotelephone where the backlighting is operable. Once the slide switch 110 detects that the slide 20 has left its open position, LEDs 32b are again deactivated.

The LEDs 32a are deactivated after a set period during which the radiotelephone has not been actively used.

(ii) Partial Keyboard Access Required i.e. Only Keys 31a.

The user may wish to do this, for example, in order to operate a web browser, other over the air services where limited key access is sufficient, or simply to retrieve some information from the memory of the radiotelephone.

On depressing one of the keys 31a, because the slide switch 110 is providing an indication that the cover is not in its open position, the control processing unit 100 instructs the backlighting driver 130 to activate only the LEDS 32a associated with the LCD 10 and the visible keys 31a. This is the situation in FIG. 4(b) in which the box 50 represents the area of the radiotelephone where the backlighting is operable.

The LEDs 32a are deactivated after a set period during which the radiotelephone has not been actively used.

(iii) Full Keyboard Access Required.

The user may wish to do this, for example, to enter data alphanumeric data into the memory of the radiotelephone.

Moving the slide 20 to its open position will cause the control processing unit 100 to activate the backlighting to the extent permitted by the position of the slide 20, that is, activate the LEDs 32b and 32a. This is the situation in FIG. 4(a) in which the box 50 represents the area of the radiotelephone where the backlighting is operable. In this case, when the slide 20 is returned to its closed position, the control processing unit 100 instructs the backlighting driver 130 to deactivate both sets of LEDs 32b and 32a.

Thus, it will be appreciated that when the slide 20 is in its closed position, the LEDs 32a associated with the display 10 can be activated or deactivated according to the specific user-interface functionality programmed into the control processing unit 100.

Using a single switch 110 to provide an indication of the position of the slide 20 results in there being a range of positions where the actual position of the slide 20 is not precisely known by the control processing unit 100. For example, if the slide switch 110 detects when the slide 20 has reached its open position, all other positions including the fully closed position will be interpreted by the control processing unit 100 as the closed position. This means, according to the user-interface functionality of the first and second embodiments, that, just before the slide reaches its fully open position, the backlighting will still not have been activated. On the other hand, if the slide switch detects when the slide 20 has reached its closed position, all other positions including the fully open position will be interpreted by the control processing unit 100 as the open position. This means, according to the user-interface functionality of the first and second embodiments, that, as soon as the slide 20 just leaves its fully closed position, say, to an almost closed position, the backlighting will be activated.

In a further embodiment (not shown), the slide switch 110 is implemented as analogue transducer means operable to produce an analogue signal indicative of the position of the slide and the individual rows of keys on the keypad 30 are directly addressable by the backlighting driver 130. In this way, the lighting provided by the handset can be more finely matched to the position of the slide. Alternatively, finer matching can be achieved, in another embodiment, by using a plurality of spaced slide switches to determine more accurately the position of the slide 110. Clearly, this embodiment is not suitable for analogous implementation using a cover in the form of a slide.

What is claimed is:

1. A radiotelephone handset, including a display;
   a keypad;
   a cover moveable between a closed position and an open position in which the keypad is accessible to the user; and
   means for lighting the display and keypad to an extent limited by the position of the cover.

2. A radiotelephone handset as in claim 1, wherein, when the cover is in the closed position, the display and all the keys of the keypad are obscured by the cover, when the cover is in the closed position, the lighting means is not operable to provide any lighting.

3. A radiotelephone handset as in claim 1, wherein, when the cover is in the closed position, all the keys of the keypad, but not the display, are obscured by the cover, when the cover is in the closed position, the lighting means can provide lighting to only the display.

4. A radiotelephone handset as in claim 1, wherein, in when the cover is in a closed position, some, but not all of the keys and not the display, are obscured by the cover, when the cover is in the closed position, the lighting means can light only the display and those keys of the keypad not obscured by the cover.

5. A radiotelephone handset as in claim 1, wherein the cover comprises a slide.

6. A radiotelephone handset as in claim 1, wherein the cover comprises a flip.

7. A method of controlling a radiotelephone handset including a user-moveable cover and user input interface lighting, wherein the user input interface lighting is activated only for those portions of the user input interface which are not hidden by the cover as determined by a detected estimate of the position of the cover.

8. A radiotelephone handset comprising:
   a display;
   a keypad;
   a cover movable between a closed position and an open position in which the keypad is accessible to the user; and
   lighting means for lighting the display and keypad in dependence upon the position of the cover wherein, when a portion of the keypad is hidden by the cover, the lighting means is operable only for those portions of the keypad that are not hidden by the cover as determined by an estimate of the position of the cover.

9. A radiotelephone handset comprising:
   a display;
   a keypad;
   a cover movable between a closed position and an open position, in which a keypad is accessible to the user; and
   lighting means for lighting and displaying the keypad, in dependence upon the position of the cover, wherein when the cover is at a first position, the lighting means is operable to illuminate a first portion of the keypad and the display while a second portion of the keypad remains without illumination, and, when the cover is in a second position, the lighting means is operable, to illuminate the first and second portions of the keypad and the display.

10. A radiotelephone handset as in claim 9, wherein the first position is an intermediate position between the closed and fully open positions.

11. A radiotelephone handset as in claim 9, wherein the second position of the cover is a fully open position.

12. A radiotelephone handset as in claim 9, wherein the first portion of the keypad is exposed when the cover is in the first position, while the second portion of the keypad is covered when the cover is in the first position.

* * * * *